United States Patent
Chen et al.

(10) Patent No.: US 11,821,314 B2
(45) Date of Patent: Nov. 21, 2023

(54) UNDERGROUND MINING METHOD FOR UNEXPLOITED COAL IN BOUNDARY OPEN-PIT MINE

(71) Applicants: CHINA UNIVERSITY OF MINING AND TECHNOLOGY, Xuzhou (CN); Xinjiang Tianchi Energy Co., Ltd., Changji Prefecture (CN); China Energy Group Xinjiang Energy Company Ltd, Urumqi (CN)

(72) Inventors: Shuzhao Chen, Xuzhou (CN); Fuming Liu, Xuzhou (CN); Bo Chang, Xuzhou (CN)

(73) Assignees: CHINA UNIVERSITY OF MINING AND TECHNOLOGY, Xuzhou (CN); XINJIANG TIANCHI ENERGY CO., LTD., Changji Prefecture (CN); CHINA ENERGY GROUP XINJIANG ENERGY COMPANY LTD, Urumqi (CN)

( * ) Notice: Subject to any disclaimer, the term of this patent is extended or adjusted under 35 U.S.C. 154(b) by 0 days.

(21) Appl. No.: 18/159,102

(22) Filed: Jan. 25, 2023

(65) Prior Publication Data
US 2023/0235667 A1 Jul. 27, 2023

(30) Foreign Application Priority Data
Jan. 26, 2022 (CN) .......................... 202210096686.3

(51) Int. Cl.
E21C 41/18 (2006.01)
E21C 41/28 (2006.01)
E21C 41/32 (2006.01)
E02D 17/20 (2006.01)
C02F 103/10 (2006.01)

(52) U.S. Cl.
CPC .......... E21C 41/18 (2013.01); *C02F 2103/10* (2013.01); *E02D 17/20* (2013.01); *E21C 41/28* (2013.01); *E21C 41/32* (2013.01)

(58) Field of Classification Search
CPC ...... C02F 2103/10; E02D 17/20; E21C 41/18; E21C 41/28; E21C 41/32
See application file for complete search history.

(56) References Cited

U.S. PATENT DOCUMENTS 1,207,569 A * 12/1916 Langerfeld ............. E21C 41/18
299/33
4,466,669 A * 8/1984 Sellers .................... E21C 41/28
299/18

* cited by examiner

*Primary Examiner* — Janine M Kreck
(74) *Attorney, Agent, or Firm* — Bayramoglu Law Offices LLC

(57) ABSTRACT

An underground mining method for unexploited coal in a boundary open-pit mine is provided. A shaft construction platform is arranged at one rock step to two rock steps above a coal seam. Intermediate bridges are built starting from a pit bottom. Mining area clay is laid on a working slope where no intermediate bridge is built and on a side slope with an outcrop of the coal seam as a sealing layer to seal the slopes. Auxiliary vertical shafts and main inclined shafts are dug. The pit bottom is dug downward to form a digging space on a side close to the working slope between two adjacent ones of the intermediate bridges, and clay is filled into the digging space to form an artificial water barrier layer. A roadway communicating the main inclined shafts and the auxiliary vertical shafts is constructed, and a coal seam stope face is arranged.

6 Claims, 2 Drawing Sheets

UNDERGROUND MINING METHOD FOR UNEXPLOITED COAL IN BOUNDARY OPEN-PIT MINE

CROSS REFERENCE TO THE RELATED APPLICATIONS

This application is based upon and claims priority to Chinese Patent Application No. 202210096686.3, filed on Jan. 26, 2022, the entire contents of which are incorporated herein by reference.

TECHNICAL FIELD

The present disclosure relates to an underground mining method, and specifically to an underground mining method for unexploited coal in a boundary open-pit mine.

BACKGROUND

According to incomplete statistics, by 2020, there are hundreds of large open-pit mines in China that have been mined. All open-pit mines will face or have faced the problem of reaching the production boundary. It is difficult to recover the unexploited coal at the slope of the boundary open-pit mines, resulting in a waste of resources. In addition, because the boundary is reached, open-pit mines will no longer produce benefits, resulting in a shortage of funds for pit treatment. In addition, the unexploited coal at the slope is left unattended and exposed for a long time, which is likely to cause spontaneous combustion, waste resources and pollute the environment.

At present, some scholars have studied the recovery of the unexploited coal at the slope in open-pit mines, and put forward plans such as steep end-slope mining and underground mining. However, it is found on the spot that in the current solutions, steep end-slope mining can only recover part of the unexploited coal at the slope, and the slope stability will decline after the slope angle is increased. Underground mining can improve the recovery of unexploited coal at the slope, but the feasibility of the plan is restricted by the large amount of construction work, high costs, fracture of coal at the slope due to compression, fully developed cracks, and severe air leakage during the ventilation in the pit.

SUMMARY

In view of the problems in the prior art, the present disclosure provides an underground mining method for unexploited coal in a boundary open-pit mine, to achieve a high resource recovery rate, low transportation costs, and good slope stability.

To achieve the above objective, the present disclosure adopts the following technical solutions. An underground mining method for unexploited coal in a boundary open-pit mine is provided, including the following steps:
  step 1: determination of a shaft construction platform, including: arranging the shaft construction platform at one rock step to two rock steps above a coal seam;
  step 2: construction of intermediate bridges, including: laying a mining area material starting from a pit bottom to form the intermediate bridges communicating a working slope with a non-working slope, where a bridge deck height of each of the intermediate bridges is equal to a height of the shaft construction platform, the intermediate bridges are arranged at intervals, and a distance between two adjacent ones of the intermediate bridges is 10 times a height of each of the intermediate bridges;
  step 3: sealing of slopes, including: laying mining area clay on the working slope where no intermediate bridge is built and on a side slope with an outcrop of the coal seam as a sealing layer to seal the slopes;
  step 4: digging of auxiliary vertical shafts and main inclined shafts, including: firstly, constructing a first main inclined shaft extending into the coal seam in the slopes in an inclined or pseudo-inclined manner at a position of the shaft construction platform where an end slope and the working slope intersect; then vertically constructing an auxiliary vertical shaft at a position of the shaft construction platform where a first intermediate bridge and the working slope intersect, and constructing a second main inclined shaft at a position of the shaft construction platform where a second intermediate bridge and the working slope intersect, where a bottom of the auxiliary vertical shaft is even with a bottom of the first main inclined shaft and a bottom of the second main inclined shaft; and continuing to dig the auxiliary vertical shafts and the main inclined shafts starting from a third intermediate bridge in a pattern of every two main inclined shafts sandwiching one auxiliary vertical shaft;
  step 5: construction of a water-sealed pit bottom, including: digging the pit bottom downward to form a digging space on a side close to the working slope between two adjacent ones of the intermediate bridges, and filling clay into the digging space to form an artificial water barrier layer, where a boundary of the artificial water barrier layer is connected and well joined to a boundary of the sealing layer;
  step 6: mining of the unexploited coal, including: constructing a roadway communicating the main inclined shafts and the auxiliary vertical shafts and arranging an underground stope face for mining of the unexploited coal at the end slope of the open-pit mine, where every two main inclined shafts and one auxiliary vertical shaft constitute an unexploited coal mining unit; and
  step 7: laying of water purification slopes, including: building the water purification slopes extending to the artificial water barrier layer on two sides of a slope surface of a respective one of the intermediate bridges corresponding to each of the auxiliary vertical shafts; and subsurface flow wetlands for purifying mine water discharged from the auxiliary vertical shafts and collecting atmospheric precipitation in the pit are built on the water purification slopes, to provide water source guarantee for production and ecological restoration of the mining area.

Further, a top width of each of the intermediate bridges is a width of a two-lane roadway for mining equipment.

Further, an inclination angle of each of the main inclined shafts is 10°-15°, and a belt conveyor for raw coal lifting is arranged in each of the main inclined shafts and connected to a belt conveyor at a top of a respective one of the intermediate bridges. Raw coal is lifted to the ground through a belt conveyor arranged on the non-working slope to prevent the deformation of the working slope at the boundary after the coal seam is mined from affecting the operation stability of the lifting belt conveyor.

Further, each of the water purification slopes has an incline of not greater than 2% and a length of not less than 100 m.

Further, the pit bottom is dug downward to a depth of 3 m-5 m in the step 5, and the permeability of the artificial water barrier layer constructed by filling the clay is less than 10 mD.

Further, a thickness of the sealing layer in the step 3 is 3 m-5 m, and the permeability of the sealing layer is less than 10 mD.

Compared with the prior art, in the present disclosure, the main inclined shafts and the auxiliary vertical shafts that alternately extend are used for mining of unexploited coal at the slope, to improve the resource recovery rate. The present disclosure is especially applicable to open-pit mines where the length of the working line is greater than 1000 m and the thickness of the coal seam is greater than 10 m, and provides follow-up financial support for the treatment of the boundary open-pit mine. After mining, the underground transportation distance of raw coal is smaller, and belt conveyors are used for both underground and lifting transportation, thereby reducing equipment investments and raw coal transportation costs. Two main inclined shafts share one auxiliary vertical shaft for ventilation, and multiple sets of mining equipment can be arranged to improve the mining speed and reduce the production costs. The intermediate bridges are connected to the working slope and non-working slope of the boundary to support the slopes while providing a running channel for equipment, thereby improving the slope stability during resource mining. The sealed slopes and the water-sealed pit bottom jointly provide a relatively sealed space for resource mining to reduce the problem of air leakage in the roadway. The water purification slopes realize the filtration of seepage and the collection of precipitation, improving the utilization of water resources and ensuring the safety of the shafts in the rainy season.

DETAILED DESCRIPTION OF THE EMBODIMENTS

The present disclosure is further described below with reference to the accompanying drawings.

The technical solutions in the embodiments of the present disclosure will be described clearly and fully with reference to the accompanying drawings in the embodiments of the present disclosure. Apparently, the embodiments described are merely some embodiments, rather than all of the embodiments of the present disclosure. All other embodiments obtained by a person of ordinary skill in the art without creative efforts based on the embodiments of the present disclosure shall fall within the protection scope of the present disclosure.

Figure 1:
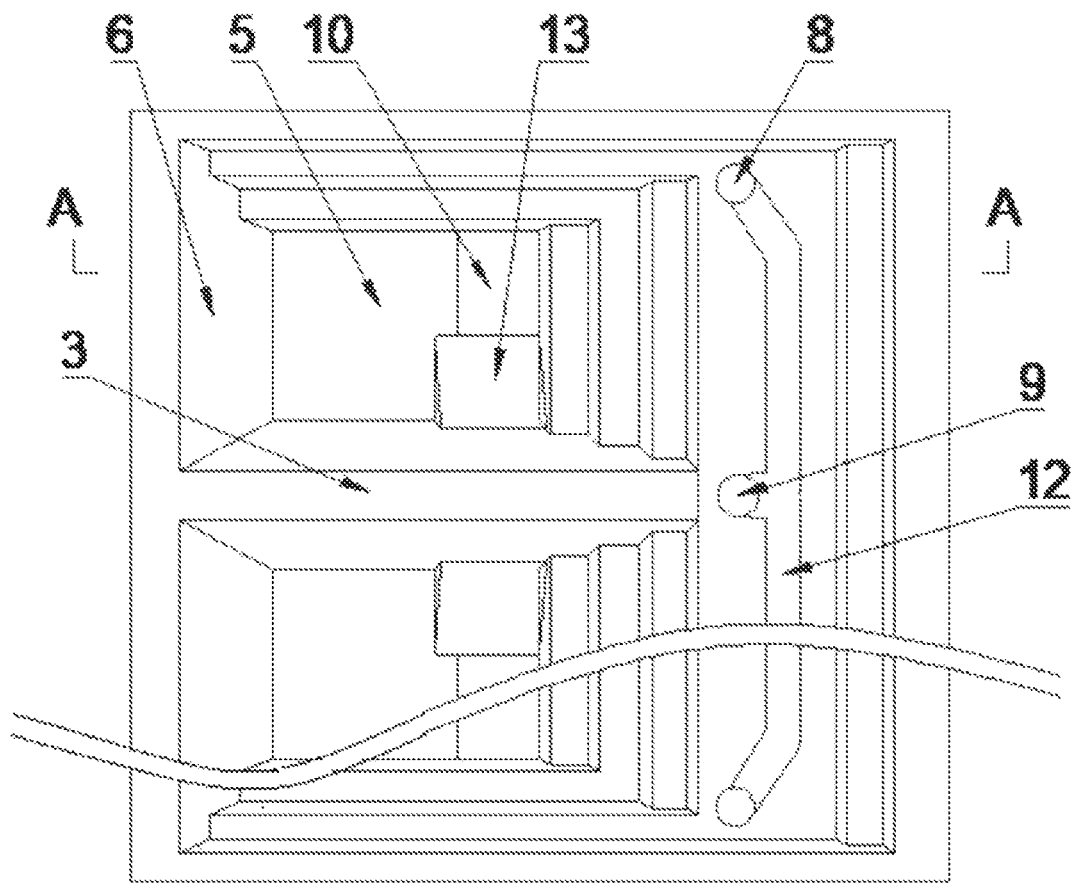
FIG. 1 is a top view of the present disclosure.
Figure 2:
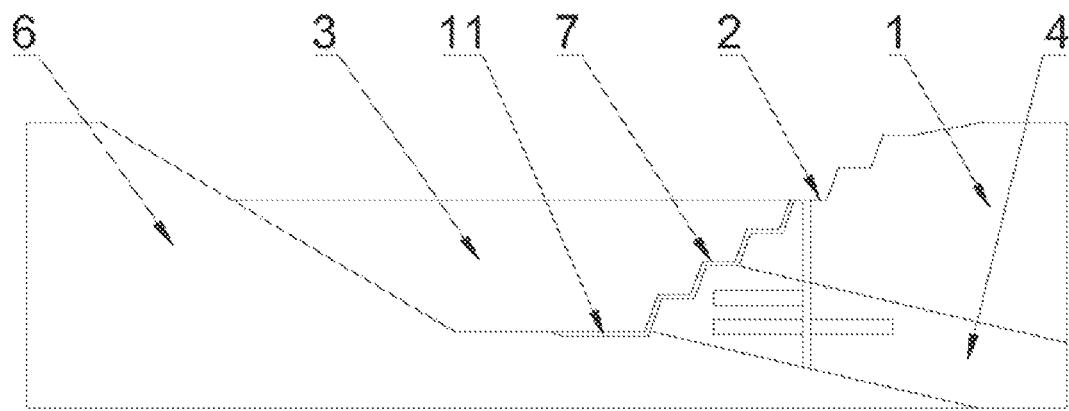
FIG. 2 is a cross-sectional view of FIG. 1 along line A-A.
In the drawings: 1. working slope; 2. shaft construction platform; 3. intermediate bridge; 4. coal seam; 5. pit bottom; 6. non-working slope; 7. sealing layer; 8. main inclined shaft; 9. auxiliary vertical shaft; 10. water-sealed pit bottom; 11. artificial water barrier layer; 12. roadway; 13. water purification slope.

The present disclosure provides a technical solution. As shown in FIG. 1, first, a shaft construction platform 2 is determined. After a working slope 1 reaches a boundary, sampling and analysis are carried out for the working slope 1. Considering the impact of the solution on the slope stability, the level of the mining shaft, i.e., a minimum height of intermediate bridges 3 to be built, is determined. Preferably, the shaft construction platform 2 is arranged at one to two rock steps above a coal seam 4.

After the shaft construction platform 2 is determined, the intermediate bridges 3 are built. A mining area material is laid starting from a pit bottom 5 to form passages communicating the working slope 1 with a non-working slope 6. The passages are the intermediate bridges 3. A bridge deck height of each of the intermediate bridges 3 is equal to a height of the shaft construction platform 6. The intermediate bridges 3 are arranged at intervals, and a distance between two adjacent ones of the intermediate bridges 3 is 10 times a height of each of the intermediate bridges 3. A top width of each of the intermediate bridges 3 is a width of a two-lane roadway for mining equipment. The intermediate bridge 3 allows equipment to travel thereon and may further be equipped with a coal transportation equipment. At the same time, the intermediate bridge 3 also acts as a presser foot for the working slope 1, which reduces the slope angle of the local part of the slope and improves the stability of the working slope 1.

After the building of the intermediate bridges 3 is completed, the slopes are sealed. Mining area clay or other materials with strong compactness after encountering water or compaction are laid on the working slope 1 where no intermediate bridge 3 is built and on a side slope with an outcrop of the coal seam 4 as a sealing layer 7 to seal the slopes. After the slopes are sealed, a roadway 12 inside is relatively isolated from the outside during mining of resources inside, thereby avoiding or reducing the air leakage in the roadway 12, and reducing weathering at the outcrop of the coal seam 4 and the risk of spontaneous combustion.

Auxiliary vertical shafts 9 and main inclined shafts 8 are dug. Firstly, a main inclined shaft 8 extending into the coal seam 4 in the slopes is constructed in an inclined or pseudo-inclined manner at a position of the shaft construction platform 2 where an end slope and the working slope 1 intersect. An inclination angle of each of the main inclined shafts 8 is 10-15°, to facilitate the arrangement of a belt conveyor for raw coal lifting in the main inclined shaft 8 to realize belt transportation. Then, then an auxiliary vertical shaft 9 is vertically constructed at a position of the shaft construction platform 2 where a first intermediate bridge 3 and the working slope 1 intersect, and another main inclined shaft 8 is constructed at a position of the shaft construction platform 2 where a second intermediate bridge 3 and the working slope 1 intersect. Bottoms of the auxiliary vertical shafts 9 are even with bottoms of the main inclined shafts 8. Auxiliary vertical shafts 9 and main inclined shafts 8 continue to be dug starting from a third intermediate bridge 3 in a pattern of every two main inclined shafts sandwiching one auxiliary vertical shaft.

After the main and auxiliary shafts are dug, a water-sealed pit bottom 10 is constructed. The pit bottom 5 is dug downward by 3-5 m to form a digging space on a side close to the working slope 1 between two adjacent ones of the intermediate bridges 3, and clay or other materials that can harden after encountering water and has a water insulation property are filled into the digging space to form an artificial water barrier layer 11, to achieve a long-term water isolation function. The artificial water barrier layer 11 has the same thickness as the sealing layer 7. Upper and lower boundaries of the artificial water barrier layer 11 are aligned with, connected to, and well joined with upper and lower boundaries of the sealing layer 7, to ensure the integrity of sealing. A space above the artificial water barrier layer 11 is the water-sealed pit bottom 10.

Unexploited coal is mined. The roadway 12 communicating the main inclined shafts 8 and the auxiliary vertical shafts 9 is constructed. In order to reduce the quantity of auxiliary vertical shafts 9 to be constructed, every two main inclined shafts 8 share one auxiliary vertical shaft 9. A ventilator is installed above the auxiliary vertical shaft 9 for ventilation in the roadway 12. The roadway 12 communicating the main inclined shafts 8 and the auxiliary vertical shafts 9 is constructed, and an underground stope face is arranged for mining of unexploited coal at the end slope of the open-pit mine. Every two main inclined shafts 8 and one auxiliary vertical shaft 9 constitute an unexploited coal mining unit. When the thickness of the coal seam 4 exceeds 10 m, a slicing method is adopted for mining. The two main inclined shafts 8 corresponding to the same auxiliary vertical shaft 9 are extended alternately. During the extension of one main inclined shaft 8, production and transportation are carried out through the other main inclined shaft 8, thereby improving the efficiency.

Water purification slopes 13 are laid. Gentle slopes extending to the artificial water barrier layer 11 are built on two sides of a slope surface of a respective one of the intermediate bridges 3 corresponding to each of the auxiliary vertical shafts 9. The gentle slopes are the water purification slopes 13. The water purification slopes 13 extend from the slope surface of the intermediate bridge 3 to a boundary of the artificial water barrier layer 11. Subsurface flow wetlands for purifying mine water discharged from the auxiliary vertical shafts and collecting atmospheric precipitation in the pit are built on the water purification slopes 13, to provide water source guarantee for production and ecological restoration of the mining area. The water purification slope 13 has an incline of not greater than 2% and a length of not less than 100 m, and is constructed using a material with natural filtration function such as fine sand. Seepage in the roadway 12 is discharged to the top of the water purification slope 13 through the main inclined shaft 8, subjected to the natural filtration of the water purification slope 13, and finally collected to the water-sealed pit bottom 10. When the mining area rains, the precipitation is collected to the water-sealed pit bottom 10 in the same way. The water-sealed pit bottom 10 provides a water seal for the underground mining roadway 12 therebelow to avoid air leakage in the roadway 12; can purify mine water seepage for industrial use to improve the utilization rate of water resources; and collects water when the mining area rains, to prevent the precipitation from flowing back into the main inclined shafts 8 and the auxiliary vertical shafts 9.

It will be apparent to those skilled in the art that the present disclosure is not limited to the details of the above-described exemplary embodiments, and the present disclosure may be embodied in other specific forms without departing from the spirit or essential characteristics of the present disclosure. Therefore, the embodiments are to be regarded in all respects as exemplary and non-limiting, and the scope of the present disclosure is to be defined by the appended claims rather than the foregoing description. Hence, all changes falling within the meaning and scope of the equivalents of the claims are intended to be included in the present disclosure. Any reference signs in the claims shall not be construed as limiting the involved claims.

The above descriptions are only preferred embodiments of the present disclosure and are not intended to limit the present disclosure. Any modification, equivalent replacement, or improvement made to the above embodiments based on the technical essence of the present disclosure shall be included in the protection scope of the technical solutions of the present disclosure.

What is claimed is:

1. An underground mining method for unexploited coal in a boundary open-pit mine, comprising the following steps:
    step 1: determination of a shaft construction platform, comprising: arranging the shaft construction platform at one rock step to two rock steps above a coal seam;
    step 2: construction of intermediate bridges, comprising: laying a mining area material starting from a pit bottom to form the intermediate bridges communicating a working slope with a non-working slope, wherein the intermediate bridges are arranged at intervals, and a distance between two adjacent ones of the intermediate bridges is 10 times a height of each of the intermediate bridges;
    step 3: sealing of slopes, comprising: laying mining area clay on the working slope where no intermediate bridge is built and on a side slope with an outcrop of the coal seam as a sealing layer to seal the slopes;
    step 4: digging of auxiliary vertical shafts and main inclined shafts, comprising: firstly, constructing a first main inclined shaft extending into the coal seam in the slopes in an inclined or pseudo-inclined manner at a position of the shaft construction platform where an end slope and the working slope intersect; then vertically constructing an auxiliary vertical shaft at a position of the shaft construction platform where a first intermediate bridge and the working slope intersect, and constructing a second main inclined shaft at a position of the shaft construction platform where a second intermediate bridge and the working slope intersect, wherein a bottom of the auxiliary vertical shaft is even with a bottom of the first main inclined shaft and a bottom of the second main inclined shaft; and continuing to dig the auxiliary vertical shafts and the main inclined shafts starting from a third intermediate bridge in a pattern of every two main inclined shafts sandwiching one auxiliary vertical shaft;
    step 5: construction of a water-sealed pit bottom, comprising: digging the pit bottom downward to form a digging space on a side close to the working slope between two adjacent ones of the intermediate bridges, and filling clay into the digging space to form an artificial water barrier layer, wherein a boundary of the artificial water barrier layer is connected to a boundary of the sealing layer;
    step 6: mining of the unexploited coal, comprising: constructing a roadway communicating the main inclined shafts and the auxiliary vertical shafts and arranging an underground stope face for mining of the unexploited coal at the end slope of the open-pit mine, wherein every two main inclined shafts and one auxiliary vertical shaft constitute an unexploited coal mining unit; and
    step 7: laying of water purification slopes, comprising: building the water purification slopes extending to the artificial water barrier layer on two sides of a slope surface of a respective one of the intermediate bridges corresponding to each of the auxiliary vertical shafts.

2. The underground mining method for the unexploited coal in the boundary open-pit mine according to claim 1, wherein a top width of each of the intermediate bridges is a width of a two-lane roadway for mining equipment.

3. The underground mining method for the unexploited coal in the boundary open-pit mine according to claim 1, wherein an inclination angle of each of the main inclined shafts is 10°-15°, and a belt conveyor for raw coal lifting is arranged in each of the main inclined shafts.

4. The underground mining method for the unexploited coal in the boundary open-pit mine according to claim 1, wherein each of the water purification slopes in the step 7 has an incline of not greater than 2% and a length of not less than 100 m.

5. The underground mining method for the unexploited coal in the boundary open-pit mine according to claim 1, wherein the pit bottom is dug downward to a depth of 3 m-5 m in the step 5.

6. The underground mining method for the unexploited coal in the boundary open-pit mine according to claim 1, wherein a thickness of the sealing layer in the step 3 is 3 m-5 m.

* * * * *